(12) United States Patent
Singh et al.

(10) Patent No.: US 9,315,413 B2
(45) Date of Patent: Apr. 19, 2016

(54) GLASS ENAMEL FOR AUTOMOTIVE APPLICATIONS

(71) Applicant: Ferro Corporation, Mayfield Heights, OH (US)

(72) Inventors: Sandeep K. Singh, Strongsville, OH (US); George E. Sakoske, Independence, OH (US); David A. Klimas, Pittsburgh, PA (US)

(73) Assignee: Ferro Corporation, Mayfield Heights, OH (US)

( * ) Notice: Subject to any disclaimer, the term of this patent is extended or adjusted under 35 U.S.C. 154(b) by 20 days.

(21) Appl. No.: 14/370,102

(22) PCT Filed: Feb. 20, 2013

(86) PCT No.: PCT/US2013/026800
§ 371 (c)(1),
(2) Date: Jul. 1, 2014

(87) PCT Pub. No.: WO2013/126369
PCT Pub. Date: Aug. 29, 2013

(65) Prior Publication Data
US 2015/0013390 A1    Jan. 15, 2015

Related U.S. Application Data

(60) Provisional application No. 61/603,249, filed on Feb. 25, 2012.

(51) Int. Cl.
| | | |
|---|---|---|
| *C03C 17/23* | (2006.01) | |
| *C03C 8/04* | (2006.01) | |
| *C03C 8/18* | (2006.01) | |
| *C03C 8/14* | (2006.01) | |
| *C03C 8/16* | (2006.01) | |
| *C03C 3/089* | (2006.01) | |
| *C03C 3/093* | (2006.01) | |
| *C03C 17/04* | (2006.01) | |

(52) U.S. Cl.
CPC ............... *C03C 17/23* (2013.01); *C03C 3/089* (2013.01); *C03C 3/093* (2013.01); *C03C 8/04* (2013.01); *C03C 8/14* (2013.01); *C03C 8/16* (2013.01); *C03C 8/18* (2013.01); *C03C 17/04* (2013.01); *C03C 2207/00* (2013.01); *C03C 2217/23* (2013.01); *C03C 2217/72* (2013.01); *C03C 2217/78* (2013.01)

(58) Field of Classification Search
CPC ..................................... C03C 8/04; C03C 8/18
See application file for complete search history.

(56) References Cited

U.S. PATENT DOCUMENTS

| | | | |
|---|---|---|---|
| 2,920,971 A | 1/1960 | Stookey | |
| 4,859,225 A | 8/1989 | Kuster et al. | |
| 5,202,292 A | 4/1993 | Tanabe et al. | |
| 5,334,412 A | 8/1994 | Korn et al. | |
| 5,783,507 A | 7/1998 | Sakoske | |
| 5,925,160 A | 7/1999 | Sakoske | |
| 6,022,624 A | 2/2000 | Sakoske | |
| 6,105,394 A | 8/2000 | Sridharan et al. | |
| 6,936,556 B2 | 8/2005 | Sridharan et al. | |
| 8,007,930 B2 | 8/2011 | Sakoske | |
| 8,772,189 B2 | 7/2014 | Singh et al. | |
| 2002/0033659 A1 | 3/2002 | Nishikawa et al. | |
| 2004/0029703 A1* | 2/2004 | Sridharan | ................ C03C 8/02 501/73 |
| 2011/0277505 A1 | 11/2011 | Sakoske | |

FOREIGN PATENT DOCUMENTS

| | | |
|---|---|---|
| CN | 1827544 A | 9/2006 |
| EP | 0192844 A2 | 12/1985 |
| JP | 2007-176785 | 7/2007 |

OTHER PUBLICATIONS

Espacenet bibliographic data for CN Publication No. 18277544 published Sep. 6, 2006, one page.
International Search Report for corresponding PCT/US2013/026800 mailed May 30, 2013, one page.
Extended European Search Report for corresponding EP 13751641 mailed Oct. 8, 2015, five pages.
Japanese patent abstract for JP2007-176785 published Jul. 12, 2007, one page.

\* cited by examiner

*Primary Examiner* — Russell Kemmerle, III
(74) *Attorney, Agent, or Firm* — Rankin, Hill & Clark LLP

(57) ABSTRACT

This invention relates to glass and enamel compositions. The glass compositions include $SiO_2$, $Nb_2O_5$, $Na_2O$, $B_2O_3$, ZnO, $Bi_2O_3$, $TiO_2$, $MoO_3$, $ZrO_2$, $Y_2O_3$, $Al_2O_3$, $Li_2O$, and $K_2O$. The glass compositions can be used to form an enamel on a substrate, for example, to decorate and/or protect the substrate.

21 Claims, No Drawings

GLASS ENAMEL FOR AUTOMOTIVE APPLICATIONS

TECHNICAL FIELD

This invention relates to glass and enamel compositions, methods of forming enamel compositions, and methods of forming an enamel on a substrate. The subject invention can provide low firing, chemically durable and anti-stick enamels that can be suitable for use in automotive glass windows.

BACKGROUND

Lead-free and cadmium-free glass compositions are generally used to form glass frits which are, in turn, used to formulate glass enamel compositions. These glass/glass ceramic enamel compositions are useful for forming decorative coatings for glassware, chinaware, architectural glass and the like.

One particular application for lead and cadmium free glass enamel compositions that fuse at low temperatures is the formation of opaque, dark colored enamel bands on sections of automotive glass, such as windshields and side and rear windows. Automotive manufacturers have found that the appearance of a section of glass is greatly enhanced by applying a relatively narrow, opaque, dark colored enamel band around one or more edges of a section of glass on the inner surface thereof. This band may vary somewhere about 2.5 cm to about 15 cm in width. In addition to imparting an aesthetically appealing appearance to the section of the glass, these opaque, colored enamel bands preferably block the transmission of sunlight and thereby prevent the degradation of underlying adhesive by ultraviolet radiation. Moreover, these opaque colored enamel bands preferably conceal a section of the silver-containing buss bars and wiring connections of rear glass defrosting systems from view from the outside of the vehicle.

In general, these enamel compositions contain a glass frit, a colorant and an organic vehicle. They are applied to a desired substrate and subsequently fired to burn off the organic vehicle and fuse the frit, thus bonding the enamel coating to the substrate.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one aspect, an enamel composition is provided. More particularly, in accordance with this aspect, the enamel composition includes a solid portion including a frit portion. The frit portion includes, prior to firing: about 22 to about 42.5 wt. % of $SiO_2$; about 0 to about 30 wt. % of $Nb_2O_5$; about 2.5 to about 11.3 wt. % of $Na_2O$; about 4 to about 20 wt. % of $B_2O_3$; about 10 to about 35 wt. % of ZnO; about 0 to about 20 wt. % of $Bi_2O_3$; about 0 to about 7 wt. % of $TiO_2$; about 6 to about 24 wt. % of $MoO_3$; about 0 to about 5.5 wt. % of $ZrO_2$; about 0 to about 8 wt. % of $Y_2O_3$; about 0 to about 5 wt. % of $Al_2O_3$; about 0.5 to about 3.5 wt. % of $Li_2O$; and about 0 to about 1.8 wt. % of $K_2O$, wherein the total of $TiO_2+Al_2O_3+ZrO_2$ is less than about 7 wt. %, and preferably less than about 6 wt. %.

In accordance with another aspect, a method for forming an enamel composition is provided. More particularly, in accordance with this aspect, the method involves combining a glass frit portion and a vehicle wherein the glass frit portion comprises about 22 to about 42.5 wt. % of $SiO_2$; about 0 to about 30 wt. % of $Nb_2O_5$; about 2.5 to about 11.3 wt. % of $Na_2O$; about 4 to about 20 wt. % of $B_2O_3$; about 10 to about 35 wt. % of ZnO; about 0 to about 20 wt. % of $Bi_2O_3$; about 0 to about 7 wt. % of $TiO_2$; about 7 to about 20 wt. % of $MoO_3$; about 0 to about 5.5 wt. % of $ZrO_2$; about 0 to about 8 wt. % of $Y_2O_3$; about 0 to about 5 wt. % of $Al_2O_3$; about 0.5 to about 3.5 wt. % of $Li_2O$; and about 0 to about 1.8 wt. % of $K_2O$, wherein the total of $TiO_2+Al_2O_3+ZrO_2$ is less than about 7 wt. %, and preferably less than about 6 wt. %. Also, preferably, the enamel contains less than 1 wt. % $F_2$.

In accordance with yet another aspect, a method of forming an enamel on a substrate. More particularly, in accordance with this aspect, the method involves providing an enamel composition on the substrate, the enamel composition containing a solid portion, the solid portion containing a frit portion, the frit portion containing, prior to firing: about 22 to about 42.5 wt. % of $SiO_2$; about 0 to about 30 wt. % of $Nb_2O_5$; about 2.5 to about 11.3 wt. % of $Na_2O$; about 4 to about 20 wt. % of $B_2O_3$; about 10 to about 35 wt. % of ZnO; about 0 to about 20 wt. % of $Bi_2O_3$; about 0 to about 7 wt. % of $TiO_2$; about 6 to about 24 wt. % of $MoO_3$; about 0 to about 5.5 wt. % of $ZrO_2$; about 0 to about 8 wt. % of $Y_2O_3$; about 0 to about 5 wt. % of $Al_2O_3$; about 0.5 to about 3.5 wt. % of $Li_2O$; and about 0 to about 1.8 wt. % of $K_2O$, wherein the total of $TiO_2+Al_2O_3+ZrO_2$ is less than about 7 wt. %, and preferably less than about 6 wt. %, and preferably, the enamel contains less than 1 wt. % $F_2$; and firing the enamel composition and the substrate at a temperature sufficient to adhere the enamel composition to the substrate.

To the accomplishment of the foregoing and related ends, the invention, then, involves the features hereinafter fully described and particularly pointed out in the claims. The following description set forth in detail certain illustrative embodiments of the invention. These embodiments are indicative, however, of but a few of the various ways in which the principles of the invention may be employed. Other objects, advantages and novel features of the invention will become apparent from the following detailed description of the invention.

DETAILED DESCRIPTION OF THE INVENTION

Improvements have been made in enamel compositions in recent years. However, the low firing ability, chemical durability, anti-stick properties and expansion matching of enamel systems for automotive applications has been desired or all these properties were not achieved all together. Therefore, a need exists for enamel compositions for automotive applications which exhibit excellent chemical durability to acids, water, and alkalis. Such enamel compositions are desired to fuse at low temperatures and partially crystallize at temperatures at which sections of glass are preheated preparatory to forming operations so not to stick to press or vacuum heads. Moreover, such enamel compositions are desired to have low or no $Bi_2O_3$ to limit the use of an expensive bismuth oxide.

The subject glass frit compositions can contain low $Bi_2O_3$ (e.g., <20, 16, or 12 wt. %) or no $Bi_2O_3$ and produce enamel compositions which partially crystallize upon firing and form opaque matt finish. In one embodiment, the subject invention provides bismuth-free, chemically durable frit enamel compositions in zinc silicate base glass. In another embodiment, the subject invention provides low-bismuth, chemically durable frit enamel compositions in zinc silicate base glass. The enamel possesses great chemical and mechanical strength. The glass frit composition is particularly useful in enamel compositions which are to be fired on the underlying article while the composition is in contact with another surface, for instance a mould surface for the article. The composition substantially does not stick on the other surface during the firing, for instance to the mould during the firing and any bending, and this enables the article to be molded and fired at the same time.

The subject glass frit compositions, enamel compositions containing the glass frit compositions, and methods for making the enamel can overcome the problems of enamel compositions sticking to the mold when the composition is fired in contact with it. Accordingly, in a preferred embodiment, the subject enamel compositions are applied to the surface of glass for a window pane of an automotive vehicle, which glass is then shaped or bent by mold into the desired curved shape of the window pane while the glass frit composition is fired in contact with a surface of the mold. The subject invention provides new and useful glass enamel compositions which exhibit various distinct advantages over conventional glass enamels.

The components of the subject compositions, articles and methods are detailed herein below. Compositional percentages are by weight. Certain embodiments of the invention are envisioned where at least some percentages, temperatures, times, and ranges of other values are preceded by the modifier "about" All compositional percentages are by weight and are given for a blend prior to firing. Details on each ingredient follow.

Frit (Glass) Component

The glass frit compositions include $SiO_2$, $Nb_2O_5$, $Na_2O$, $B_2O_3$, ZnO, $Bi_2O_3$, $TiO_2$, $MoO_3$, $ZrO_2$, $Y_2O_3$, $Al_2O_3$, $Li_2O$, and $K_2O$. The frit portions herein include $SiO_2$: broadly 22-42.5 wt. %, preferably 24-38.5 wt. % and more preferably 28-34.5 wt. %; $Nb_2O_5$: broadly 0-30 wt. %; preferably 2-28 wt. % and more preferably 5.5-25.5 wt. %; $Na_2O$: broadly 2.5-11.3 wt. %; preferably 3.5-9.3 wt. % and more preferably 4.5-7.3 wt. %; $B_2O_3$: broadly 4-20 wt. %; preferably 5-18 wt. % and more preferably 6-14 wt. %; ZnO: broadly 10-35 wt. %; preferably 12-33 wt. % and more preferably 14-30 wt. %; $Bi_2O_3$: broadly 0-20 wt. %; preferably 3-16 wt. % and more preferably 5-12 wt. %; $TiO_2$: broadly 0-7 wt. %; preferably 2.2-6 wt. % and more preferably 3.4-6 wt. %; $MoO_3$: broadly 6-24 wt. %; preferably 7-20 wt. % and more preferably 7.5-18.5 wt. %; $ZrO_2$: broadly 0-5.5 wt. %; preferably 0.3-5 wt. % and more preferably 0.7-4.5 wt. %; $Y_2O_3$: broadly 0-8 wt. %; preferably 0.2-7.6 wt. % and more preferably 0.5-5.6 wt. %; $Al_2O_3$: broadly 0-5 wt. %; preferably 0.8-3.6 wt. % and more preferably 1-2.5 wt. %; $Li_2O$: broadly 0.5-3.5 wt. %; preferably 0.7-3 wt. % and more preferably 0.8-2.6 wt. %; and $K_2O$: broadly 0-1.8 wt. %; preferably 0.4-1.4 wt. % and more preferably 0.6-1 wt. %.

Combinations of ranges of oxides indicated hereinabove as "broad," "preferably," and "more preferably" in various combinations are available, so long as such combinations of ranges can add up to 100 wt. %. For example, the frit portions include, prior to firing, about 22 to about 42.5 wt. % of $SiO_2$, about 2 to about 28 wt. % of $Nb_2O_5$, about 2.5 to about 11.3 wt. % of $Na_2O$, about 4 to about 20 wt. % of $B_2O_3$, about 10 to about 35 wt. % of ZnO, about 3 to about 16 wt. % of $Bi_2O_3$, about 2.2 to about 7 wt. % of $TiO_2$, about 6 to about 24 wt. % of $MoO_3$, about 0.3 to about 5 wt. % of $ZrO_2$, about 0.2 to about 7.6 wt. % of $Y_2O_3$, about 0.8 to about 3.6 wt. % of $Al_2O_3$, about 0.5 to about 3.5 wt. % of $Li_2O$, and about 0.4 to about 1.4 wt. % of $K_2O$.

In another embodiment, the frit portions include, prior to firing, about 28 to about 34.5 wt. % of $SiO_2$, about 5.5 to about 25.5 wt. % of $Nb_2O_5$, about 4.5 to about 7.3 wt. % of $Na_2O$, about 6 to about 14 wt. % of $B_2O_3$, about 14 to about 30 wt. % of ZnO, about 5 to about 12 wt. % of $Bi_2O_3$, about 3.4 to about 6 wt. % of $TiO_2$, about 7 to about 20 wt. % of $MoO_3$, about 0.7 to about 4.5 wt. % of $ZrO_2$, about 0.5 to about 5.6 wt. % of $Y_2O_3$, about 1 to about 2.5 wt. % of $Al_2O_3$, about 0.8 to about 2.6 wt. % of $Li_2O$, and about 0.6 to about 1 wt. % of $K_2O$.

In yet another embodiment, the frit portions include, prior to firing, about 22 to about 42.5 wt. % of $SiO_2$, about 2 to about 28 wt. % of $Nb_2O_5$, about 4.5 to about 7.3 wt. % of $Na_2O$, about 5 to about 18 wt. % of $B_2O_3$, about 10 to about 35 wt. % of ZnO, about 3 to about 16 wt. % of $Bi_2O_3$, about 3.4 to about 6 wt. % of $TiO_2$, about 7.5 to about 18.5 wt. % of $MoO_3$, about 0.5 to about 5.5 wt. % of $ZrO_2$, about 0.2 to about 7.6 wt. % of $Y_2O_3$, about 1 to about 2.5 wt. % of $Al_2O_3$, about 0.7 to about 3 wt. % of $Li_2O$, and about 0 to about 1.8 wt. % of $K_2O$.

In still yet another embodiment, the frit portions include, prior to firing, about 28 to about 34.5 wt. % of $SiO_2$, about 2 to about 28 wt. % of $Nb_2O_5$, about 2.5 to about 11.3 wt. % of $Na_2O$, about 5 to about 18 wt. % of $B_2O_3$, about 14 to about 30 wt. % of ZnO, about 3 to about 16 wt. % of $Bi_2O_3$, about 0 to about 6 wt. % of $TiO_2$, about 8 to about 18 wt. % of $MoO_3$, about 0.7 to about 4.5 wt. % of $ZrO_2$, about 0.2 to about 7.6 wt. % of $Y_2O_3$, about 0 to about 5 wt. % of $Al_2O_3$, about 0.7 to about 3 wt. % of $Li_2O$, and about 0.6 to about 1 wt. % of $K_2O$.

Preferably, in the glass enamels of the present invention the total of $TiO_2+Al_2O_3+ZrO_2$ is less than about 7 wt. %, and preferably less than about 6%. Also, preferably, the enamel contains less than about 1 wt. % $F_2$.

Table 1 below shows glass frit compositions useful in the practice of the subject invention. The oxide constituent amounts for an embodiment need not be limited to those in a single column such as I, II, or III. Oxide ranges from different columns in the same table can be combined so long as the sum of those ranges can add up to 100 wt. %.

TABLE 1

| | Glass Frit Compositions (weight %) | | |
|---|---|---|---|
| Oxide Component | Glass Frit Composition | | |
| | I | II | III |
| $SiO_2$ | 22-42.5 | 24-38.5 | 28-34.5 |
| $Nb_2O_5$ | 0-30 | 2-28 | 5.5-25.5 |
| $Na_2O$ | 2.5-11.3 | 3.5-9.3 | 4.5-7.3 |
| $B_2O_3$ | 4-20 | 5-18 | 6-14 |
| ZnO | 10-35 | 12-33 | 14-30 |
| $Bi_2O_3$ | 0-20 | 3-16 | 5-12 |
| $TiO_2$ | 0-7 | 2.2-6 | 3.4-6 |
| $MoO_3$ | 6-24 | 7-20 | 7.5-18.5 |
| $ZrO_2$ | 0-5.5 | 0.3-5 | 0.7-4.5 |
| $Y_2O_3$ | 0-8 | 0.2-7.6 | 0.5-5.6 |
| $Al_2O_3$ | 0-5 | 0.8-3.6 | 1.0-2.5 |
| $Li_2O$ | 0.5-3.5 | 0.7-3 | 0.8-2.6 |
| $K_2O$ | 0-1.8 | 0.4-1.4 | 0.6-1.0 |

$SiO_2$ can serve as a network former and it may be essential for the control of the chemical, thermal and mechanical properties. If its content is less than about 22 wt. %, the chemical durability tends to be poor, and if it exceeds 42.5 wt. %, the glass softening points tends to be too high, and it will be difficult to fire the composition to the glass sheet at the temperature for bending the glass sheet.

$Na_2O$, $K_2O$, and $Li_2O$ can serve as a flux component and the melting property of the glass can be remarkably improved. However, higher amount of $Na_2O$ tends to degrade the chemical durability and also increase expansion. To prevent the adverse effect of mobile alkali ions, a combination of alkali ion oxides are incorporated which improves the desired properties by blockage effect. The $Na_2O$ content should be less than 7.3 wt. %, $K_2O$ less than 1 wt. % and $Li_2O$ less than 2.6 wt. %. In one embodiment, their total contents should not be more than 11 wt. % and the amount of $Na_2O$ should be greater than 4.5 wt. %.

$Nb_2O_5$ can improve the chemical durability by strengthening the glass network and also help blocking the migration of mobile species. $Nb_2O_5$ is an effective component for obtaining the high refractive index too, and coexistence with $Bi_2O_3$ improves the devitrification resistance which helps during press or vacuum molding and improves the anti-stick properties of enamel system.

$TiO_2$ can be incorporated for adjusting the sintering temperature, the chemical durability or the thermal expansion coefficient. However, if $TiO_2$ content is not present in the above-mentioned composition range, other oxides such as $Al_2O_3$, $ZrO_2$, and $Y_2O_3$ are incorporated to improve the chemical resistance. In absence of $TiO_2$, the sum of $Al_2O_3$, $ZrO_2$, and $Y_2O_3$ is more than 10 wt. % and whenever $TiO_2$ is present, the sum of $Al_2O_3$, $ZrO_2$, and $Y_2O_3$ is not more than 6 wt. %. In most applications in order to limit the firing temperature the total of $TiO_2+Al_2O_3+ZrO_2$ is less than about 7 wt. %, and preferably less than about 6 wt. %. Also, preferably, the enamel contains less than about 1 wt. % $F_2$. In the presence of high alkali contents, the proper formulation of these oxides may be crucial to chemical durability.

$B_2O_3$ can serve as a flux and reduce the firing temperature, surface gloss, and color development. Especially when refractive oxides (e.g., $Al_2O_3$, $ZrO_2$, $TiO_2$, $Y_2O_3$, and $Nb_2O_5$) are used, the content of $B_2O_3$ is in the range of 6 to 14 wt. %, A lower amount of $B_2O_3$ (e.g., <6 wt. %) tends to increase the softening temperature and a higher amount of $B_2O_3$ (e.g., >20 wt. %) tends to degrade the chemical durability and exhibit poor mold release property.

ZnO can serve as a fusing or smelting agent. ZnO has the capability of lowering the softening point of the frit and improving mechanical properties. ZnO can improve the waterproof characteristic and chemical endurance of the enamel and also provides gloss development in enamel. Content of ZnO below 10 wt. % may produce an adverse influence on the waterproof characteristic and color development while content over 35 wt. % may adversely affect the durability of the enamel. For this reason, the ZnO ranges from 10 to 35 wt. %, preferably from 12 to 33 wt. % and more preferably from 14 to 30 wt. %.

$MoO_3$ can help in reducing the melting temperature and firing temperature. However, in one embodiment, excessive amount of $MoO_3$ should be avoided, because at high temperatures $MoO_3$ tends to sublime and the reduction in the melting temperature will be not achieved. In the present invention, the preferred amount of $MoO_3$ is 6-24 wt. %.

$Bi_2O_3$ is not essential, but can be used as a flux component and help in reducing firing temperature. Preferably, if included, $Bi_2O_3$ is within a range of from 5 to 12 wt. %.

In order to get desired properties such as low firing temperature, chemical durability, and reasonable expansion, the compositional range of individual oxides of present inventive frits should be in the above mentioned ranges.

The glass frits can be formed by any suitable techniques. In one embodiment, the glass frits are formed by blending the starting materials (e.g., aforementioned oxides) and melting together at a temperature of about 1800 to about 2400° F. for about 45 minutes to form a molten glass having the desired composition. The molten glass formed can then be suddenly cooled by any suitable technique, including water quenching, to form a frit. The frit can then be ground using, for example, milling techniques to a fine particle size from about 1 to about 8 microns, preferably 2 to about 6 microns, and more preferably about 3 to about 5 microns.

In one embodiment, the frit portions are substantially free of at least one of the elements selected from the group consisting of lead, cadmium, and bismuth. In another embodiment, the subject frit portions are substantially free of lead and cadmium, but the frit portions include bismuth. As used herein, "substantially free of an element" means that the frit portions do not include the element in any form, or the element or any compounds that contain the element are not intentionally added to the frit portions. For example, in some embodiments, all the materials used in forming the frit portions are substantially free of at least one of the elements selected from the group consisting of lead, cadmium, and bismuth. In another embodiment, a method of making the frit portions does not involve combining at least one of the elements selected from the group consisting of lead, cadmium, and bismuth with the frit portions and/or precursor materials of the frit portions.

Enamel Composition

The enamel compositions can include the above-described glass frit compositions. The enamel compositions can include the glass frit compositions and a vehicle with the optional presence of a pigment such as a metal oxide pigment, as described in detail below. In one embodiment, the enamel compositions further include crystallization materials, reducing agents, and conductive metals. The solid portion of the enamel composition is considered to be the glass frit portion, the pigment, the crystallization material, the reducing agents, and the metals, taken together.

The enamel compositions can include any suitable amount of the glass frit composition. In one embodiment, the solid portions of the enamel compositions include about 30 to about 95 wt. % of the frit portion. In another embodiment, the enamel compositions include about 35 to about 93 wt. % of the frit portion. In yet another embodiment, the enamel compositions include about 40 to about 90 wt. % of the frit portion.

Metal

In one embodiment, the glass enamel compositions are formulated with conductive metals such as silver (e.g., silver particles) in order to provide conductive coatings for use, for example, as defrost circuits for automotive blacklights and windshield. In such areas of utility, color maintenance, bond strength, solderability, absence of silver migration and abrasion resistance are required performance characteristics. It is to be noted that the compositions containing the subject glass frits are applicable for use in conjunction with such conductive coatings for the above noted areas of utility. When the conductive coatings are applied in overlapping relationship with the enamels containing the glass frits, performance improvements as observed after heat treatment can include good resistance to silver migration into the enamel, substantial reduction of undesirable blue haze of the buss bar and performance of solder connections.

In one embodiment, when the enamel compositions include silver metal, the solid portions of the enamel compositions include about 10 to about 60 wt. % of the silver metal. In another embodiment, the enamel compositions include about 15 to about 55 wt. % of the silver metal. In yet another embodiment, the enamel compositions include about 20 to about 50 wt. % of the silver metal.

The glass frits compositions and the enamel compositions can have an improved thermal expansion coefficient. In one embodiment, the glass frits compositions and the enamel compositions have a thermal expansion coefficient of about $10 \times 10^{-6}$ °C.$^{-1}$ or less from 25° C. to 325° C. In another embodiment, the glass frits compositions and the enamel compositions have a thermal expansion coefficient of about $9 \times 10^{-6}$ °C.$^{-1}$ or less from 25° C. to 325° C. In yet another embodiment, the glass frits compositions and the enamel compositions have a thermal expansion coefficient of about $8 \times 10^{-6}$ °C.$^{-1}$ or less from 25° C. to 325° C.

Pigment

In certain embodiments, the glass frit can be combined with a pigment, such as a mixed metal oxide pigment. When used, such pigments generally constitute no greater than about 50 wt. %, preferably 0.1-48 wt. %, more preferably 1-45 wt. %, still more preferably 5-40 wt. %, of the solid portions of the enamel compositions herein, depending upon the range of color, gloss, and opacity (e.g., transmittance) desired.

Examples of pigments can come from several of the major classifications of complex inorganic pigments, including corundum-hematite, olivine, priderite, pyrochlore, rutile, and spinel. Other categories such as baddeleyite, borate, garnet, periclase, phenacite, phosphate, sphene and zircon may be suitable in certain applications.

The glass frit (e.g., finely ground glass frit) can be combined with pigments such as a mixed metal oxide pigment, any other type of metal powder, metal resonate, or other material of choice. Typical complex metal oxide pigments used to produce black colors in the automotive industry would include oxides of copper, chrome, iron, cobalt, nickel, manganese, and the like. Although these black spinel pigments are preferred for use in the automotive industry, other metal oxide pigments to produce other various colors can be combined with the glass frit compositions in this invention. Examples of other end uses include architectural, appliance, and beverage industries.

Examples of commercially available pigments include $CuCr_2O_4$, $(Co,Fe)(Fe,Cr)_2O_4$, (NiMnCrFe), and the like. Specific examples available from Ferro Corporation, Washington, Pa. include pigments having the following Ferro Corporation product numbers: 2980 which is a cobalt chromium iron black pigment and V792 pigment which is a nickel manganese iron chromium black pigment.

Crystalline Material

The enamel compositions can contain solids of crystalline seed materials along with the frit compositions herein to promote crystallization. Examples of crystalline seed materials include zinc silicates, aluminum silicate, zinc borates, zinc titanates, bismuth silicate and combinations thereof. Specific examples of crystalline seed materials include $Zn_2SiO_4$, $2ZnO \cdot 3TiO_2$, $ZnTiO_3$, $ZnO \cdot B_2O_3$, $3ZnO \cdot B_2O_3$, and $5ZnO \cdot 2B_2O_3$. Further information on crystalline materials can be found in, for example, U.S. Pat. No. 5,153,150 and U.S. Pat. No. 5,714,420 patents, which are hereby incorporated by reference. In one embodiment, the enamel compositions include zinc silicate (such as $Zn_2SiO_4$) or bismuth silicate (such as $Bi_2SiO_4$). In another embodiment, the enamel compositions include product number 2099, which is a zinc silicate seed material or product number 2077, which is a bismuth silicate seed material and both are commercially available at Ferro Corporation, Washington, Pa.

The enamel compositions can include any suitable amount of the solids of crystalline seed materials. In one embodiment, the solid portions of the enamel compositions include about 0.1 to about 20 wt. %, preferably about 0.5 to about 10 wt. %, and more preferably about 1 to about 5 wt. % of at least one crystalline material. In another embodiment, the enamel compositions include about 0.1 to about 15 wt. % of at least one crystalline material. The crystalline seed material can yield anti-stick properties advantageous in press-bend forming operations such as those used in the automotive glass industry.

Organic Vehicle

The glass frits and enamel compositions can be combined with a vehicle. The glass frits can be combined with the vehicle to form a printable enamel paste. The vehicle to be employed in the paste can be selected on the basis of its end use application. In one embodiment, the vehicle adequately suspends the particulates and burns off completely upon firing of the paste on the substrate. Vehicles are typically organic. Examples of organic vehicles include compositions based on pine oils, vegetable oils, mineral oils, low molecular weight petroleum fractions, tridecyl alcohols, synthetic and natural resins, and the like. In another embodiment, surfactants and/or other film forming modifiers can also be included.

The specific vehicle and amounts employed are selected based upon the specific components of the paste and the desired viscosity. The enamel paste in general can contain from about 60 to about 85 wt. % solids as above described, more preferably about 65 to about 83 wt. % solids, and about 15 to about 40 wt. % of the suitable organic vehicle, more preferably about 17 to about 35 wt. %.

The viscosity of the paste can be adjusted depending on application techniques on a substrate such as screen printing, roll coating or spraying. The vehicles can be modified by viscous resins such as vinyl resins, solvents, film formers such as cellulosic materials, and the like. For purposes of screen-printing, viscosities ranging from 10,000 to 80,000 and preferably 35,000 to 65,000 centipoises at 20° C., as determined on a Brookfield Viscometer, #7 spindle at 20 rpm, are appropriate.

Reducing Agent

In certain embodiments, the enamel compositions include a reducing agent. For example, the solid portions of the enamel compositions include metals such as silicon, added separately from any oxide, in an amount of about 0.1 to about 5 wt. %, preferably about 0.5 to about 4.5 wt. % more preferably about 1 to about 4 wt. %. Silicon metal is a reducing agent which prevents or minimizes the extent of oxidation, especially of silver metal in conductive traces. Sulfides also can act as reducing agents. Such reducing agents have the desired effect of preventing or minimizing the extent of silver migration into a glass substrate or coating. Other metals that enhance the desired properties of the glass enamels herein or at a minimum, do not degrade such desired properties, are also envisioned herein. For example, metals from which the oxides used in the frits or pigments herein may be used, keeping in mind the preferences for low or essentially zero levels of heavy metals such as lead and cadmium.

In one embodiment, the solid portions include about 30 to about 95 wt. % of the frit portion; about 0.1 to about 48 wt. % pigment; about 0.1 to about 15 wt. % crystalline material; about 10 to about 60 wt. % silver; and optionally about 0.1 to about 5 wt. % reducing agent.

Dispersing Surfactant

In certain embodiments, the enamel compositions include a dispersing surfactant. The dispersing surfactant assists in pigment wetting, when an insoluble particulate inorganic pigment is used. A dispersing surfactant typically contains a block copolymer with pigment affinic groups. Examples of surfactants include surfactants sold under the Disperbyk® and Byk® trademarks by Byk Chemie of Wesel, Germany, such as Disperbyk 162 and 163, which are solutions of high molecular weight block copolymers with pigment affinic groups, and a blend of solvents (xylene, butylacetate and methoxypropylacetate). Disperbyk 162 has these solvents in a 3/1/1 ratio, while the ratio in Disperbyk 163 is 4/2/5. Disperbyk 140 is a solution of alkyl-ammonium salt of an acidic polymer in a methoxypropylacetate solvent.

Rheological Modifier

In certain embodiments, the enamel compositions include a rheological modifier. The rheological modifier can be used to adjust the viscosity of the enamel composition. A variety of rheological modifiers can be used. Examples of rheological modifiers include those sold under the Byk®, Disperplast®, and Viscobyk® trademarks, available from Byk Chemie. They include, for example, BYK 400 series, such as BYK 411 and BYK 420, (modified urea solutions); BYK W-900 series, (pigment wetting and dispersing additives); Disperplast series, (pigment wetting and dispersing additives for plastisols and organosols); and Viscobyk series, (viscosity depressants for plastisols and organosols).

Flow Aid

In certain embodiments, the enamel compositions include a flow aid. The flow aid is an additive used to control the viscosity and rheology of enamel compositions, which affects the flow properties of liquid systems in a controlled and predictable way. Rheology modifiers are generally considered as being either pseudoplastic or thixotropic in nature. Examples of flow aids include those sold commercially under the Additol®, Multiflow®, and Modaflow® trademarks by UCB Surface Specialties of Smyrna, Ga. Specific examples include Additol VXW 6388, Additol VXW 6360, Additol VXL 4930, Additol XL 425, Additol XW 395, Modaflow AQ 325
30, Modaflow AQ 3025, Modaflow Resin, and Multiflow Resin.

Adhesion Promoter

In certain embodiments, the enamel compositions include an adhesion promoter. Adhesion promoting polymers can be used to improve the compatibility between a substrate and enamel. Examples of adhesion promoters include those sold by GE Silicones of Wilton, Conn. under the Silquest®, CoatOSil®, NXT®, XL-Pearl™ and Silcat® trademarks, including the following product numbers, sold under the Silquest® trademark: A1101, A1102, A1126, A1128, A1130, A1230, A1310, A162, A174, A178, A187, A2120. For example, Silquest® A-187 is (3-glycidoxypropyl) trimethoxysilane, which is an epoxysilane adhesion promoter.

Stabilizers

In certain embodiments, the enamel compositions include light or UV stabilizers. Light or UV stabilizers are classified according to their mode of action: UV blockers—that act by shielding the substrate from ultraviolet light; or hindered amine light stabilizers (HALS)—that act by scavenging the radical intermediates formed in a photo-oxidation process. In one embodiment, the compositions of the invention include about 0.1 to about 2 wt. % of a light stabilizer, preferably about 0.5 to about 1.5 wt. %, and further include about 0.1 to about 4 wt. % of a UV blocker, preferably about 1 to about 3 wt. %.

Examples of Light stabilizers and UV blockers include those sold under the Irgafos®, Irganox®, Irgastab®, Uvitex®, and Tinuvin® trademarks by Ciba Specialty Chemicals, Tarrytown, N.Y., including product numbers 292 HP, 384-2, 400, 405, 411 L, 5050, 5055, 5060, 5011, all using the Tinuvin trademark. Suitable UV blocking agents include Norbloc 7966 (2-(2' hydroxy-5' methacryloxyethylphenyl)-2H-benzotriazole); Tinuvin 123 (bis-(2,2,6,6-tetramethyl-1-(octyloxy)-4-piperidinyl) ester); Tinuvin 99 (3-(2H-benzotriazole-2-yl) 5-(1,1-dimethyl ethyl)-4-hydroxybenzenepropanoic acid, C7-9-branched alkyl esters) Tinuvin 171 (2-(2H-benzotriazol-2-yl)-6-dodecyl-4-methylphenol). Products sold under the Norbloc® trademark are available from Janssen Pharmaceutica of Beerse, Belgium. Suitable hindered amine light stabilizers (HALS) are sold by the Clariant Corporation, Charlotte, N.C., under the Hostavin® trademark, including Hostavin 845, Hostavin N20, Hostavin N24, Hostavin N30, Hostavin N391, Hostavin PR31, Hostavin ARO8, and Hostavin PR25.

Substrate

The invention can provide a substrate having fired thereon an enamel compositions (e.g., enamel paste) of the invention. Any suitable substrate can be used in the subject invention. Examples of substrates include glass, ceramic or other nonporous substrates. Specific examples of substrates include an automotive glass substrate, architectural glass, appliances and beverage containers.

Method of Forming Enamel on Substrate

To prepare the enamel compositions of the invention, the necessary frit or frits are ground to a fine powder using conventional techniques including milling. The frit component is then combined with the other solids components. The solids are then mixed with the necessary vehicle to form the enamel paste. The viscosity is adjusted as desired.

Once the enamel paste is prepared, it can be applied to the substrate by any suitable technique. The enamel paste can be applied by screen printing, decal application, spraying, brushing, roller coating or the like. Screen printing can be preferred when the paste is applied to a glass substrate.

After application of the paste to a substrate in a desired pattern, the applied coating is then fired to adhere the enamel to the substrate. The firing temperature is generally determined by the frit maturing temperature, and preferably is in a broad temperature range. Typically, the firing range is in the range of about 1000° F. to about 1250° F., more preferably in the range of about 1020° F. to about 1200° F., and most preferably about 1040° F. to about 1150° F. In one embodiment, the enamel composition is capable of being fired at about 1200° F. or less. In many applications, it is beneficial if the enamel fires at less than about 1100° F.

A glass substrate can be colored and/or decorated by applying any enamel composition described herein to at least a portion of a substrate, for example, a glass substrate such as a glass sheet, or automotive glass, (e.g., windshield). An enamel composition can be applied in the form of a paste as disclosed herein.

In one embodiment, the method of forming an enamel composition involves combining a glass frit comprising about 22 to about 42.5 wt. % of $SiO_2$; about 0 to about 30 wt. % of $Nb_2O_5$; about 2.5 to about 11.3 wt. % of $Na_2O$; about 4 to about 20 wt. % of $B_2O_3$; about 10 to about 35 wt. % of ZnO; about 0 to about 20 wt. % of $Bi_2O_3$; about 0 to about 7 wt. % of $TiO_2$; about 6 to about 24 wt. % of $MoO_3$; about 0 to about 5.5 wt. % of $ZrO_2$; about 0 to about 8 wt. % of $Y_2O_3$; about 0 to about 5 wt. % of $Al_2O_3$; about 0.5 to about 3.5 wt. % of $Li_2O$; and about 0 to about 1.8 wt. % of $K_2O$. In another embodiment, the method of forming an enamel composition involves combining a glass frit comprising: about 24 to about 38.5 wt. % of $SiO_2$; about 2 to about 28 wt. % of $Nb_2O_5$; about 3.5 to about 9.3 wt. % of $Na_2O$; about 5 to about 18 wt. % of $B_2O_3$; about 12 to about 33 wt. % of ZnO; about 3 to about 16 wt. % of $Bi_2O_3$; about 2.2 to about 6 wt. % of $TiO_2$; about 7 to about 20 wt. % of $MoO_3$; about 0.3 to about 5 wt. % of $ZrO_2$; about 0.2 to about 7.6 wt. % of $Y_2O_3$; about 0.8 to about 3.6 wt. % of $Al_2O_3$; about 0.7 to about 3 wt. % of $Li_2O$; and about 0.4 to about 1.4 wt. % of $K_2O$. In yet another embodiment, the method of forming an enamel composition involves combining a glass frit comprising: about 28 to about 34.5 wt. % of $SiO_2$; about 5.5 to about 25.5 wt. % of $Nb_2O_5$; about 4.5 to about 7.3 wt. % of $Na_2O$; about 6 to about 14 wt. % of $B_2O_3$; about 14 to about 30 wt. % of ZnO; about 5 to about 12 wt. % of $Bi_2O_3$; about 3.4 to about 6 wt. % of $TiO_2$; about 7.5 to about 18.5 wt. % of $MoO_3$; about 0.7 to about 4.5 wt. % of $ZrO_2$; about 0.5 to about 5.6 wt. % of $Y_2O_3$; about 1 to about 2.5 wt. % of $Al_2O_3$; about 0.8 to about 2.6 wt. % of $Li_2O$; and about 0.6 to about 1 wt. % of $K_2O$. In each of the previous methods, preferably the in the enamel composition the total of $TiO_2+Al_2O_3+ZrO_2$ is less than about 7 wt. %, and preferably less than about 6 wt. %. Also, preferably the level of $F_2$ is less than about 1 wt. %.

In one aspect, the method of forming an enamel composition further involves combining pigments; crystalline materials; optionally silver; and optionally reducing agents. In this aspect, the enamel composition is lead-free and cadmium-free. The enamel composition is also capable of being fired at about 1200° F. or less.

The enamel composition is applied to the entire surface of a substrate, or to only a portion thereof, for example the periphery. The method involves forming a glass whereby the glass substrate is heated to an elevated temperature and subjected to a forming pressure to bend the glass substrate. In particular, bending the glass substrate involves heating the glass substrate to an elevated temperature of, for example, at least about 570° C., at least about 600° C., at least about 625° C., or at least about 650° C. Upon heating, the glass is subjected to a forming pressure, e.g., gravity sag or press bending in the range of about 0.1 to about 5 psi, or about 1 to about 4 psi, or typically about 2 to about 3 psi, with a forming die.

Examples

The following compositions represent exemplary embodiments of the invention. They are presented to explain the invention in more detail, and do not limit the invention. Glass frit compositions and enamel compositions according to the present invention are given in Tables 2-7. The results of the following investigations are shown in Tables 2-7.

The glass frit compositions are produced by mixing together raw materials as shown in Tables 2-4. The mixed raw batch compositions are melted at temperatures between 1800 to 2400° F. for about 45 minutes, followed by sudden cooling, using water quenching. The glass compositions are then ground to a fine particle size, preferably between 2 to 6 microns using a ball mill. The finely ground powder frits are then used to form glass enamel compositions.

The enamel compositions are produced by using some of the glass frit compositions and other compositions such as pigments as shown in Tables 5 and 6. The finely ground glass frits are combined with a mixed metal oxide pigment to form enamel compositions. V-792 pigment is a nickel manganese iron chrome pigment, V-7702 is a chrome copper pigment, 2099 is a zinc silicate seed material and 2077 is a bismuth silicate seed material. These materials are commercially available at Ferro Corporation, Washington, Pa. Further, the solids of the enamel compositions are dispersed and suspended in a vehicle selected for the end use application to form the enamel paste. Although not shown, the glass frit compositions of the present investigation can be employed in producing other enamel formulations in the same manner as the frits of Enamels 1-32.

Testing is performed by combining 4.0 grams of the glass frit or enamel composition with a pine oil based vehicle and screen printing the resulting dispersion onto a microscope slide or automotive glass substrate at a wet thickness of 2 mils. The slides or automotive glass substrate are then fired at various temperatures to determine the "firing temperature," FT, or "minimum firing temperature," MF. The FT is the temperature where the glass has sufficient time to flow and fuse within a 15 minute fire and yield a glossy smooth surface. The MF is the temperature where the enamel has sufficient time to flow and fuse in a 3 minute fire and yield an enamel without interconnected porosity. Preheat time is 10 minutes at 800° F. for FT and no preheat for MF.

The thermal expansion coefficient (TEC) is determined from 25° C. to 325° C. using an Orton model 1000R dilatometer. The TEC is reported in the temperature range of 25° C. to 325° C. and has units of $10^{-6}$° $C.^{-1}$. Glass transition temperatures ($T_g$) and dilatometric softening temperatures ($T_d$) are measured using the dilatometer.

Room temperature chemical durability is determined for 10 wt. % citric acid, 10 wt. % hydrochloric acid, and 4 wt. % acetic acid solutions. The acid resistance is evaluated by utilizing ASTM C724-91. Fired trials are exposed to the 10 wt. % citric acid solution for 15 minutes at room temperature, 10 wt. % hydrochloric acid solution for 10 minutes at room temperature, and 4 wt. % acetic acid solution for 1 minute at room temperature. They are graded according to the following scale:

Grade 1—No apparent attack;
Grade 2—Appearance of iridescence or visible stain on the exposed surface when viewed at an angle of 45°, but not apparent when viewed at angles less than 30°;

Grade 3—A definite stain which does not blur reflected images and is visible at angles less than 30°;

Grade 4—Definite stain with a gross color change or strongly iridescent surface visible at angles less than 30° and which may blur reflected images;

Grade 5—Surface dull or matte with chalking possible;

Grade 6—Significant removal of enamel with pinholing evident;

Grade 7—Complete removal of enamel in exposed area.

Tempered and increasingly laminated glasses are produced in press-bending furnaces. For this purpose, the glass is first heated to around 640-700° C. in a roller furnace. Then the soft, hot glass runs into a press and is pressed into the required shape. This requires frits capable of flowing smoothly very quickly in the heating phase, but which do not stick to the press dies in the subsequent shaping process. These are now referred to as "anti-stick" enamels. This anti-stick property is achieved by selective control of a crystallization process of the frit after melting. As a result a crystal layer is formed on the surface of the enamel, making it less sticky (anti-stick). The anti stick properties are evaluated by printing the enamels on a 4"×4" piece of automotive glass substrate, firing in a 3 to 5 minute automotive type firing cycle, and pressing with a pad of commercially used material, while the hot enamel and substrate remain inside the furnace.

Attempts are made to simulate the press processes in laboratory ovens, in order to enable the selective adjustment of the anti-stick properties of enamel. Inside a laboratory oven, a press die is pressed onto a hot sheet of glass with applied enamel and the force required for withdrawal of the die is measured. The higher the necessary force recorded, the stickier the enamel is. The following rating for enamel can be used to estimated the anti-stick behavior:

+o: good anti-stick response <200 grams o: average or acceptable anti-stick response >200 and <600 grams −o: below average anti-stick response >600 and <1000 grams The anti-stick property is shown in Table 7. The enamels (i.e., Examples 22-32) provide anti-stick behavior in some applications.

The acid test using 0.1 N $H_2SO_4$ at 80° C. for different time intervals are conducted (this test is commonly called the Toyota test) and the color difference is measured according to the following procedure. The results are shown in Table 7. Tristimulus values, L, a* and b*, of a test sheet, represented by C.I.E. standard, are measured by a color-difference meter. Color difference, $\Delta E$ is calculated according to the following equation: $\Delta E=[(L-L_t)^2+(a^*-a_t^*)^2+(b^*-b_t^*)^2]^{1/2}$; in which L, a* and b* are values measured before the test and $L_t$, $a_t^*$ and $b_t^*$ represent values after tested time (t). The sensory degree of color difference can be summarized as follows:

$\Delta E$=0-0.5: Little color difference;

$\Delta E$=0.5-1.5: Slight color difference $\Delta E$=1.5-3.0: Moderate color difference $\Delta E$>3.0: Very considerable color difference Relative to the Tables, the following should be noted:

Table 2: In frit 1, the high level of $SiO_2$ and the elevated levels of $TiO_2$, $Al_2O_3$ and $ZrO_2$ lead to an elevated firing temperature. Frits 8 and 9 similarly suffer from elevated firing temperature due to elevated levels of $TiO_2$, $Al_2O_3$, and $ZrO_2$ (also with the incorporation of $Y_2O_3$).

Table 3: Frits 16-17 and 19-20 which do not contain any $MoO_3$, still display good performance, when high levels of $Nb_2O_5$ (>14 wt. %) are used. However, a decrease in the level of $Nb_2O_5$ content and the introducing $MoO_3$ content shows better performance. For example, frit 18 has a low firing temperature as compare to frits (16-17 and 19-20).

Tables 2-4: High levels of $Y_2O_3$ (>5.5 wt. %) in conjunction with high level of $MoO_3$ (such as frits 22, 23, 25) increases firing temperature, whereas, $Y_2O_3$ (≤5.5 wt. %) in conjunction with $MoO_3$ (frits 9-15, frit 21, frit 24, frits 26-35), shows better performances and lower firing temperature.

Table 4: Even if the level of $TiO_2+Al_2O_3+ZrO_2$ is high (7.7-11.3 wt. %), the improvement in low firing temperature is achieved with the use of $MoO_3$, but this also increases expansion (frits 28-30).

Other glass frits described herein can be employed in producing enamel formulations in the same manner as the frits of Tables 4, 5, 6 and 7 above.

TABLE 2

Glass frit formulations in wt. %, firing temperatures, and properties

| Oxides (wt. %) | 1 | 2 | 3 | 4 | 5 | 6 | 7 | 8 |
|---|---|---|---|---|---|---|---|---|
| $SiO_2$ | 42.7 | 29.5 | 32.2 | 33.5 | 33.5 | 33.5 | 30.5 | 34 |
| $B_2O_3$ | 11 | 14 | 11 | 14 | 14 | 14 | 14 | 14 |
| ZnO | 17 | 19 | 17 | 19 | 19 | 19 | 19 | 19 |
| $Na_2O$ | 4.75 | 9.5 | 9.5 | 9.5 | 7.5 | 6.5 | 8.5 | 7.4 |
| $Nb_2O_5$ | 6.5 | 8 | 6.5 | 8 | 10 | 7 | 10 | 7.2 |
| $Bi_2O_3$ | 5 | 0 | 5 | 0 | 0 | 0 | 0 | 0 |
| $MoO_3$ | 8 | 8 | 8 | 8 | 8 | 12 | 10 | 8 |
| $TiO_2$ | 0 | 0 | 0 | 0 | 0 | 0 | 0 | 6.4 |
| $Al_2O_3$ | 5 | 3 | 5 | 3 | 3 | 3 | 3 | 2.3 |
| $Y_2O_3$ | 0 | 0 | 0 | 0 | 0 | 0 | 0 | 0 |
| $ZrO_2$ | 4.5 | 2.5 | 4.5 | 2.5 | 2.5 | 2.5 | 2.5 | 0.7 |
| $Li_2O$ | 1.5 | 2.5 | 1.5 | 2.5 | 2.5 | 2.5 | 2.5 | 1 |
| $K_2O$ | 0 | 0 | 0 | 0 | 0 | 0 | 0 | 0 |
| TEC (25-325° C.) | 6.83 | 9.92 | 10.0 | 9.34 | 8.41 | 8.56 | 9.32 | 7.23 |
| $T_g$ (° C.) | 483 | 453 | 459 | 458 | 462 | 462 | 454 | 464 |
| $T_d$ (° C.) | 574 | 475 | 490 | 483 | 483 | 483 | 481 | 511 |
| Firing Temperature (° F.) | 1150 | 1020 | 1030 | 1020 | 1020 | 1040 | 1020 | 1100 |
| 10% citric Acid | 1 | 4-5 | 4-5 | 4-5 | 3-4 | 3-4 | 3-4 | 1-2 |
| 10% hydrochloric acid | 1-2 | 4-5 | 4-5 | 5 | 4-5 | 4 | 4 | 2 |
| 4% acetic acid | 1 | 1-2 | 1-2 | 1-2 | 1-2 | 1-2 | 1 | 1 |

| Oxides (wt. %) | 9 | 10 | 11 | 12 | 13 | 14 | 15 |
|---|---|---|---|---|---|---|---|
| $SiO_2$ | 32.5 | 30.5 | 30.5 | 30.5 | 30.5 | 30.5 | 30.5 |
| $B_2O_3$ | 14 | 14 | 14 | 14 | 14 | 14 | 14 |

TABLE 2-continued

Glass frit formulations in wt. %, firing temperatures, and properties

| | | | | | | | |
|---|---|---|---|---|---|---|---|
| ZnO | 19 | 19 | 19 | 19 | 19 | 19 | 19 |
| $Na_2O$ | 7.4 | 7.5 | 7.3 | 7.3 | 7.3 | 7.3 | 7.3 |
| $Nb_2O_5$ | 9.2 | 14 | 8 | 11.2 | 6.5 | 4.5 | 10 |
| $Bi_2O_3$ | 0 | 2.3 | 8.5 | 5.3 | 10 | 12 | 6.5 |
| $MoO_3$ | 8 | 2 | 2 | 2 | 2 | 2 | 2 |
| $TiO_2$ | 4.3 | 4.6 | 4.6 | 4.6 | 4.6 | 4.6 | 4.6 |
| $Al_2O_3$ | 1.3 | 2.3 | 2.3 | 2.3 | 2.3 | 2.3 | 2.3 |
| $Y_2O_3$ | 2.4 | 1 | 1 | 1 | 1 | 1 | 1 |
| $ZrO_2$ | 0.7 | 0.7 | 0.7 | 0.7 | 0.7 | 0.7 | 0.7 |
| $Li_2O$ | 1.2 | 1.3 | 1.3 | 1.3 | 1.3 | 1.3 | 1.3 |
| $K_2O$ | 0 | 0 | 0.8 | 0.8 | 0.8 | 0.8 | 0.8 |
| TEC (25-325° C.) | 7.27 | 7.67 | 7.96 | 7.79 | 7.82 | 8.05 | 7.91 |
| $T_g$ (° C.) | 487 | 485 | 476 | 482 | 476 | 474 | 477 |
| $T_d$ (° C.) | 516 | 520 | 515 | 518 | 511 | 513 | 516 |
| Firing Temperature (° F.) | 1120 | 1080 | 1070 | 1080 | 1060 | 1060 | 1070 |
| 10% citric Acid | 1-2 | 1 | 2-3 | 1-2 | 3-4 | 3-4 | 1-2 |
| 10% hydrochloric acid | 1-2 | 1-2 | 2 | 2-3 | 3-4 | 3-4 | 2 |
| 4% acetic acid | 1 | 1 | 1 | 1 | 1 | 1 | 1 |

TABLE 3

Glass frit formulations in wt. %, firing temperatures, and properties

| Oxides (wt. %) | 16 | 17 | 18 | 19 | 20 | 21 | 22 | 23 | 24 | 25 | 26 | 27 |
|---|---|---|---|---|---|---|---|---|---|---|---|---|
| $SiO_2$ | 28.5 | 32.8 | 34.4 | 30 | 30 | 30.5 | 30.5 | 30.5 | 30.5 | 28.5 | 32.5 | 30.5 |
| $B_2O_3$ | 8 | 10 | 12 | 7.2 | 6 | 10 | 8 | 6.4 | 12 | 8 | 11.4 | 8 |
| ZnO | 30 | 24 | 20 | 28 | 28 | 14 | 12 | 10 | 16 | 13 | 14.6 | 18 |
| $Na_2O$ | 6.5 | 7.5 | 9 | 5.5 | 5.5 | 7.5 | 7.3 | 7.3 | 7.3 | 7.3 | 7.5 | 7.3 |
| $Nb_2O_5$ | 20 | 16 | 14 | 20 | 25 | 6 | 0 | 0 | 0 | 0 | 0 | 0 |
| $Bi_2O_3$ | 3.8 | 6.5 | 0 | 2.5 | 0 | 2.3 | 8.5 | 5.3 | 6 | 4.5 | 5.9 | 6.5 |
| $MoO_3$ | 0 | 0 | 2 | 0 | 0 | 16 | 18 | 24 | 14 | 20 | 16.3 | 17.4 |
| $TiO_2$ | 0 | 0 | 3.6 | 3.6 | 2.4 | 4.6 | 5.4 | 3.4 | 3.6 | 4.6 | 6 | 6.5 |
| $Al_2O_3$ | 0 | 0 | 1 | 0 | 0 | 2.3 | 2.3 | 2.3 | 2.3 | 2.3 | 2.3 | 2.3 |
| $Y_2O_3$ | 0 | 0 | 0 | 0 | 0 | 4 | 6 | 8 | 5.5 | 10 | 0.5 | 0.5 |
| $ZrO_2$ | 0.7 | 0.7 | 0.7 | 0.7 | 0.7 | 0.7 | 0.7 | 0.7 | 0.7 | 0.7 | 0.7 | 0.7 |
| $Li_2O$ | 2.5 | 2.5 | 2.5 | 2.5 | 2.5 | 1.3 | 1.3 | 1.3 | 1.3 | 1.3 | 1.5 | 1.5 |
| $K_2O$ | 0 | 0 | 0.8 | 0 | 0 | 0.8 | 0 | 0.8 | 0.8 | 0.8 | 0.8 | 0.8 |
| TEC (25-325° C.) | 7.94 | 8.30 | 8.62 | 7.58 | 7.57 | 9.07 | 8.42 | 11.3 | 7.97 | 9.42 | 9.53 | 9.28 |
| $T_g$ (° C.) | 493 | 491 | 489 | 488 | 517 | 455 | 400 | — | — | 400 | 410 | 430 |
| $T_d$ (° C.) | 511 | 515 | 516 | 523 | 526 | 480 | 433 | 406 | 419 | 451 | 478 | 480 |
| Firing Temperature (° F.) | 1040 | 1030 | 1030 | 1060 | 1080 | 1120 | 1150 | 1140 | 1080 | 1160 | 1070 | 1080 |
| 10% citric Acid | 2-3 | 1-2 | 1 | 1 | 1 | 3-4 | 3 | 3 | 3 | 4 | 1 | 1 |
| 10% hydrochloric acid | 3-4 | 2-3 | 1-2 | 1 | 1 | 4 | 4 | 3-4 | 4 | 4 | 1-2 | 2 |
| 4% acetic acid | 2-3 | 1 | 1 | 1 | 1 | — | — | — | — | — | 1 | 1 |

TABLE 4

Glass frit formulations in wt. %, firing temperatures, and properties

| Oxides (wt. %) | 28 | 29 | 30 | 31 | 32 | 33 | 34 | 35 |
|---|---|---|---|---|---|---|---|---|
| $SiO_2$ | 30.5 | 36.5 | 34.4 | 31.5 | 30.5 | 30.5 | 33.5 | 31 |
| $B_2O_3$ | 10.5 | 9.4 | 8.3 | 14 | 8 | 10 | 7.5 | 8.8 |
| ZnO | 13.3 | 16 | 19 | 22 | 28 | 24 | 22 | 25.4 |
| $Na_2O$ | 7.3 | 7.3 | 7.3 | 7.3 | 7.3 | 8 | 7.3 | 8 |
| $Nb_2O_5$ | 0 | 0 | 0 | 0 | 0 | 0 | 0 | 0 |
| $Bi_2O_3$ | 4.3 | 6 | 4.5 | 10 | 8 | 7 | 11 | 9.8 |
| $MoO_3$ | 20 | 14 | 15.3 | 6 | 8 | 9 | 10 | 7.6 |
| $TiO_2$ | 8.3 | 5 | 5.3 | 3.4 | 5.5 | 6.4 | 4.3 | 4.6 |
| $Al_2O_3$ | 2.3 | 2.3 | 2.3 | 2.3 | 1.3 | 1.6 | 1 | 1 |
| $Y_2O_3$ | 0.5 | 0.5 | 0.5 | 0.5 | 0.5 | 0.5 | 0.5 | 0.7 |
| $ZrO_2$ | 0.7 | 0.7 | 0.7 | 0.7 | 0.7 | 0.7 | 0.7 | 0.7 |
| $Li_2O$ | 1.5 | 1.5 | 1.5 | 1.8 | 1.5 | 1.5 | 1.6 | 1.8 |
| $K_2O$ | 0.8 | 0.8 | 0.8 | 0.8 | 0.8 | 0.8 | 0.8 | 0.6 |
| TEC (25-325° C.) | 11.3 | 9.28 | 10.4 | 8.36 | 8.36 | 8.89 | 8.87 | 9.14 |
| $T_g$ (° C.) | 420 | 502 | 491 | 454 | 477 | 474 | 481 | 466 |
| $T_d$ (° C.) | 466 | 526 | 577 | 489 | 500 | 493 | 497 | 488 |
| Firing Temperature (° F.) | 1100 | 1100 | 1100 | 990 | 1020 | 1020 | 1030 | 1010 |

TABLE 4-continued

Glass frit formulations in wt. %, firing temperatures, and properties

| Oxides (wt. %) | 28 | 29 | 30 | 31 | 32 | 33 | 34 | 35 |
|---|---|---|---|---|---|---|---|---|
| 10% citric Acid | 1 | 1 | 1 | 4-5 | 4-5 | 4-5 | 3-4 | 4-5 |
| 10% hydrochloric acid | 1 | 2 | 3 | 5 | 5 | 5 | 3-4 | 5-6 |
| 4% acetic acid | 1 | 1 | — | 3 | 2 | 2 | 1 | 1 |

TABLE 5

Black enamel formulations in wt. %, firing data, and acid resistance performance data for pastes made with selected frits from Table 2.

| Oxides (wt. %) | Ex-1 | Ex-2 | Ex-3 | Ex-4 | Ex-5 | Ex-6 | Ex-7 | Ex-8 | Ex-9 | Ex-10 | Ex-11 | Ex-12 | Ex-13 |
|---|---|---|---|---|---|---|---|---|---|---|---|---|---|
| Frit-5 | 70.75 | 0 | 0 | 0 | 0 | 0 | 0 | 0 | 0 | 0 | 0 | 0 | 0 |
| Frit 8 | 0 | 0 | 0 | 0 | 0 | 0 | 0 | 0 | 0 | 0 | 0 | 75 | 73 |
| Frit-9 | 0 | 75 | 0 | 0 | 0 | 0 | 0 | 0 | 0 | 0 | 0 | 0 | 0 |
| Frit 10 | 0 | 0 | 0 | 0 | 0 | 0 | 0 | 0 | 0 | 75 | 73 | 0 | 0 |
| Frit-11 | 0 | 0 | 75 | 0 | 0 | 74 | 72 | 0 | 0 | 0 | 0 | 0 | 0 |
| Frit-14 | 0 | 0 | 0 | 75 | 0 | 0 | 0 | 74.5 | 72.5 | 0 | 0 | 0 | 0 |
| Frit-15 | 0 | 0 | 0 | 0 | 75 | 0 | 0 | 0 | 0 | 0 | 0 | 0 | 0 |
| V-792 | 23.58 | 25 | 25 | 25 | 25 | 21 | 21 | 21 | 21 | 21 | 21 | 21 | 21 |
| 2099 | 5.66 | 0 | 0 | 0 | 0 | 3.7 | 3.7 | 3.0 | 3.0 | 4.0 | 4.0 | 4.0 | 4.0 |
| 2077 | 0 | 0 | 0 | 0 | 0 | 1.3 | 1.3 | 1.5 | 1.5 | 0 | 0 | 0 | 0 |
| Si metal | 0 | 0 | 0 | 0 | 0 | 0 | 2.0 | 0 | 2.0 | 0 | 2.0 | 0 | 2.0 |
| Firing Temp (° F.) | 1140 | 1160 | 1095 | 1095 | 1105 | 1140 | 1140 | 1160 | 1160 | 1160 | 1160 | 1200 | 1200 |
| 10% citric acid | 4 | 1-2 | 3-4 | 3-4 | 2-3 | 4 | 4 | 4-5 | 4-5 | 3 | 2-3 | 2 | 3-4 |
| 10% hydrochloric acid | 4 | 2 | 3-4 | 3-4 | 2-3 | 4 | 4 | 4 | 4 | 3 | 2-3 | 2 | 3-4 |
| 4% acetic acid | 2 | 1 | 2 | 2 | 1-2 | 3 | 3 | 2-3 | 2-3 | 1-2 | 1-2 | 1-2 | 1-2 |

TABLE 6

Black enamel formulations in wt. %, firing data, and acid resistance performance data for pastes made with selected frits from Table 3 and Table 4.

| Oxides (wt. %) | Ex-14 | Ex-15 | Ex-16 | Ex-17 | Ex-18 | Ex-19 | Ex-20 | Ex-21 |
|---|---|---|---|---|---|---|---|---|
| Frit-17 | 75 | 0 | 0 | 70.75 | 0 | 0 | 0 | 0 |
| Frit 18 | 0 | 75 | 0 | 0 | 70.75 | 0 | 0 | 0 |
| Frit-19 | 0 | 0 | 75 | 0 | 0 | 70.75 | 0 | 0 |
| Frit-34 | 0 | 0 | 0 | 0 | 0 | 0 | 80 | 75 |
| V-792 | 25 | 25 | 25 | 23.58 | 23.58 | 23.58 | 0 | 0 |
| V-7702 | 0 | 0 | 0 | 0 | 0 | 0 | 20 | 20 |
| 2099 | 0 | 0 | 0 | 5.66 | 5.66 | 5.66 | 0 | 5 |
| Firing Temp (° F.) | 1110 | 1110 | 1130 | 1130 | 1130 | 1150 | 1120 | 1180 |
| 10% citric acid | 1-2 | 1 | 1 | 1-2 | 1 | 1-2 | 3-4 | 3-4 |
| 10% hydrochloric acid | 2-3 | 1-2 | 1 | 2-3 | 1-2 | 1-2 | 3-4 | 3-4 |
| 4% acetic acid | 1 | 1 | 1 | 1 | 1 | 1 | 2 | 2 |

TABLE 7

Anti-stick behavior of Black Enamels

| Oxides (wt. %) | Ex-22 | Ex-23 | Ex-24 | Ex-25 | Ex-26 | Ex-27 | Ex-28 | Ex-29 | Ex-30 | Ex-31 | Ex-32 |
|---|---|---|---|---|---|---|---|---|---|---|---|
| Frit 4 | 70.75 | 0 | 0 | 0 | 0 | 0 | 0 | 0 | 0 | 0 | 0 |
| Frit-6 | 0 | 0 | 0 | 0 | 0 | 0 | 0 | 0 | 75 | 0 | 0 |
| Frit-7 | 0 | 0 | 0 | 0 | 0 | 0 | 0 | 0 | 0 | 75 | 0 |
| Frit-10 | 0 | 75 | 0 | 0 | 0 | 0 | 0 | 0 | 0 | 0 | 0 |
| Frit 11 | 0 | 0 | 74 | 0 | 0 | 0 | 0 | 0 | 0 | 0 | 0 |
| Frit-14 | 0 | 0 | 0 | 74.5 | 0 | 0 | 0 | 0 | 0 | 0 | 0 |
| Frit-15 | 0 | 0 | 0 | 0 | 74 | 0 | 0 | 0 | 0 | 0 | 0 |
| Frit-17 | 0 | 0 | 0 | 0 | 0 | 70.75 | 0 | 0 | 0 | 0 | 0 |
| Frit-18 | 0 | 0 | 0 | 0 | 0 | 0 | 70.75 | 0 | 0 | 0 | 0 |
| Frit-19 | 0 | 0 | 0 | 0 | 0 | 0 | 0 | 70.75 | 0 | 0 | 0 |
| Frit-34 | 0 | 0 | 0 | 0 | 0 | 0 | 0 | 0 | 0 | 0 | 78 |

TABLE 7-continued

Anti-stick behavior of Black Enamels

| Oxides (wt. %) | Ex-22 | Ex-23 | Ex-24 | Ex-25 | Ex-26 | Ex-27 | Ex-28 | Ex-29 | Ex-30 | Ex-31 | Ex-32 |
|---|---|---|---|---|---|---|---|---|---|---|---|
| V-792 | 23.58 | 21 | 21 | 21 | 21 | 23.58 | 23.58 | 23.58 | 21 | 21 | 0 |
| V-7702 | 0 | 0 | 0 | 0 | 0 | 0 | 0 | 0 | 0 | 0 | 18 |
| 2099 | 5.66 | 4 | 3.7 | 3 | 3.7 | 5.66 | 5.66 | 5.66 | 4 | 4 | 4 |
| 2077 | 0 | 0 | 1.3 | 1.5 | 1.3 | 0 | 0 | 0 | 0 | 0 | 0 |
| ΔE (after 72 hrs) | | | 0.69 | 0.37 | 0.20 | | 0.43 | | | | |
| Anti-stick rating | ○ | ○ | ○ | −○ | −○ | −○ | −○ | ○ | ○ | −○ | ○ |

TABLE 8

Color parameters and gloss value of glass enamel layer in different firing temperature range

| | 1225 F./4 min | | | | | 1250 F./4 min | | | | | 1275 F./4 min | | | |
|---|---|---|---|---|---|---|---|---|---|---|---|---|---|---|
| Enamels | Gloss | L | a | b | Enamels | Gloss | L | a | b | Enamels | Gloss | L | a | b |
| Ex-22 | 0.60 | 5.13 | −1.58 | −2.02 | Ex-22 | 0.70 | 5.62 | −1.26 | −2.23 | Ex-22 | 1.00 | 4.78 | −1.41 | −1.76 |
| Ex-23 | 21.4 | 2.43 | −0.41 | −0.31 | Ex-23 | 23.8 | 2.38 | −0.39 | −0.11 | Ex-23 | 28.4 | 2.61 | −0.48 | 0.09 |
| Ex-24 | 5.30 | 2.72 | −0.48 | −0.21 | Ex-24 | 5.70 | 2.36 | −0.3 | −0.01 | Ex-24 | 5.30 | 2.18 | −0.36 | −0.03 |
| Ex-25 | 17.5 | 3.09 | −0.49 | −0.49 | Ex-25 | 18.10 | 2.34 | −0.67 | −0.03 | Ex-25 | 21.40 | 2.48 | −0.41 | −0.27 |
| Ex-26 | 4.80 | 2.73 | −0.63 | −0.18 | Ex-26 | 5.2 | 2.42 | −0.45 | −0.22 | Ex-26 | 5.60 | 2.35 | −0.55 | −0.28 |
| Ex-27 | 18.1 | 3.43 | −0.69 | −1.15 | Ex-27 | 28.3 | 2.87 | −0.87 | −0.21 | Ex-27 | 25.70 | 2.30 | −0.69 | −0.47 |
| Ex-28 | 4.80 | 3.46 | −0.87 | −0.55 | Ex-28 | 5.10 | 2.85 | −0.76 | −0.12 | Ex-28 | 5.80 | 6.90 | −0.94 | −1.36 |
| Ex-32 | 0.9 | 5.87 | −1.72 | −2.15 | Ex-32 | 1.00 | 5.42 | −1.45 | −1.98 | Ex-32 | 1.20 | 4.87 | −1.23 | −1.78 |

These results demonstrate the excellent performance characteristics of the glass frits and enamel compositions of the present invention, and particularly the low firing temperature, good chemical durability and anti-stick properties.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms "contain", "have", "include", and "involve" are used in either the detailed description or the claims, such terms are intended to be inclusive in a manner similar to the term "comprising" as "comprising" is interpreted when employed as a transitional word in a claim. In some instances, however, to the extent that the terms "contain", "have", "include", and "involve" are used in either the detailed description or the claims, such terms are intended to be partially or entirely exclusive in a manner similar to the terms "consisting of" or "consisting essentially of" as "consisting of" or "consisting essentially of" are interpreted when employed as a transitional word in a claim.

What is claimed is:

1. An enamel composition comprising a solid portion comprising a frit portion, wherein the frit portion, prior to firing, consists essentially of:
    about 22 to about 42.5 wt. % of $SiO_2$;
    about 2 to about 28 wt. % of $Nb_2O_5$;
    about 2.5 to about 11.3 wt. % of $Na_2O$;
    about 4 to about 20 wt. % of $B_2O_3$;
    about 10 to about 35 wt. % of ZnO;
    about 2.2 to about 6 wt. % of $TiO_2$;
    about 6 to about 24 wt. % of $MoO_3$;
    about 0 to about 5.5 wt. % of $ZrO_2$;
    about 0 to about 8 wt. % of $Y_2O_3$;
    about 0 to about 5 wt. % of $Al_2O_3$;
    about 0.5 to about 3.5 wt. % of $Li_2O$;
    about 0.4 to about 1.4 wt. % of $K_2O$; and
    no $Bi_2O_3$.

2. The enamel composition of claim 1, wherein the solid portion further comprises at least one crystalline seed material selected from the group consisting of zinc borates, zinc silicates, zinc titanates, bismuth silicates, and combinations thereof.

3. The enamel composition of claim 1, wherein the solid portion comprises:
    about 30 to about 95 wt. % of the frit portion; and further comprises:
    about 0.1 to about 48 wt. % of pigments;
    about 0.1 to about 15 wt. % of crystalline materials;
    about 10 to about 60 wt. % of silver; and optionally
    about 0.1 to about 5 wt. % of a reducing agent selected from the group consisting of silicon metal and a sulfide.

4. The enamel composition of claim 3, wherein the reducing agent is silicon metal.

5. The enamel composition of claim 3, wherein the reducing agent is a sulfide.

6. The enamel composition of claim 3, wherein the solid portion further comprises at least one crystalline seed material selected from the group consisting of zinc borates, zinc silicates, zinc titanates, bismuth silicates, and combinations thereof.

7. The enamel composition of claim 1, wherein in the glass frit portion the total of $TiO_2+Al_2O_3+ZrO_2$ is less than about 7 wt. %.

8. The enamel composition of claim 1, wherein the enamel composition is free of at least one selected from the group consisting of lead, cadmium, and bismuth.

9. The enamel composition of claim 1, wherein the frit portion consists essentially of:
    about 24 to about 38.5 wt. % of $SiO_2$;
    about 2 to about 28 wt. % of $Nb_2O_5$;
    about 3.5 to about 9.3 wt. % of $Na_2O$;
    about 5 to about 18 wt. % of $B_2O_3$;

about 12 to about 33 wt. % of ZnO;
about 2.2 to about 6 wt. % of $TiO_2$;
about 7 to about 20 wt. % of $MoO_3$;
about 0.3 to about 5 wt. % of $ZrO_2$;
about 0.2 to about 7.6 wt. % of $Y_2O_3$;
about 1.0 to about 2.5 wt. % of $Al_2O_3$;
about 0.7 to about 3 wt. % of $Li_2O$;
about 0.4 to about 1.4 wt. % of $K_2O$; and
no $Bi_2O_3$.

10. The enamel composition of claim 9, wherein the solid portion comprises:
about 30 to about 95 wt. % of the frit portion; and further comprises:
about 0.1 to about 48 wt. % of pigments;
about 0.1 to about 15 wt. % of crystalline materials;
about 10 to about 60 wt. % of silver; and optionally
about 0.1 to about 5 wt. % of a reducing agent selected from the group consisting of silicon metal and a sulfide.

11. The enamel composition of claim 10, wherein the reducing agent is silicon metal.

12. The enamel composition of claim 10, wherein the reducing agent is a sulfide.

13. The enamel composition of claim 9, wherein in the glass frit portion the total of $TiO_2+Al_2O_3+ZrO_2$ is less than about 7 wt. %.

14. The enamel composition of claim 9, wherein the enamel composition is free of at least one selected from the group consisting of lead, cadmium, and bismuth.

15. The enamel composition of claim 9, wherein the frit portion consists essentially of:
about 28 to about 34.5 wt. % of $SiO_2$;
about 5.5 to about 25.5 wt. % of $Nb_2O_5$;
about 4.5 to about 7.3 wt. % of $Na_2O$;
about 6 to about 14 wt. % of $B_2O_3$;
about 14 to about 30 wt. % of ZnO;
about 3.4 to about 6 wt. % of $TiO_2$;
about 7.5 to about 18.5 wt. % of $MoO_3$;
about 0.7 to about 4.5 wt % of $ZrO_2$;
about 0.5 to about 5.6 wt % of $Y_2O_3$;
about 1 to about 2.5 wt. % of $Al_2O_3$;
about 0.8 to about 2.6 wt. % of $Li_2O$;
about 0.6 to about 1 wt. % of $K_2O$; and
no $Bi_2O_3$.

16. The enamel composition of claim 15, wherein the solid portion comprises:
about 30 to about 95 wt. % of the frit portion; and further comprises:
about 0.1 to about 48 wt % of pigments;
about 0.1 to about 15 wt. % of crystalline materials;
about 10 to about 60 wt. % of silver; and optionally
about 0.1 to about 5 wt. % of a reducing agent selected from the group consisting of silicon metal and a sulfide.

17. The enamel composition of claim 16, wherein the reducing agent is silicon metal.

18. The enamel composition of claim 16, wherein the reducing agent is a sulfide.

19. The enamel composition of claim 15, wherein in the glass frit portion the total of $TiO_2+Al_2O_3+ZrO_2$ is less than about 7 wt. %.

20. The enamel composition of claim 15, wherein the enamel composition is free of at least one selected from the group consisting of lead, cadmium, and bismuth.

21. The enamel composition of claim 1, wherein the wherein the frit portion, prior to firing, consists essentially of:
about 22 to about 42.5 wt. % of $SiO_2$;
about 2 to about 28 wt. % of $Nb_2O_5$;
about 2.5 to about 11.3 wt. % of $Na_2O$;
about 4 to about 20 wt. % of $B_2O_3$;
about 10 to about 35 wt. % of ZnO;
about 2.2 to about 6 wt. % of $TiO_2$;
about 6 to about 24 wt. % of $MoO_3$;
about 0.7 to about 4.5 wt. % of $ZrO_2$;
about 0.2 to about 7.6 wt. % of $Y_2O_3$;
about 0.8 to about 3.6 wt. % of $Al_2O_3$;
about 0.5 to about 3.5 wt. % of $Li_2O$;
about 0.4 to about 1.4 wt. % of $K_2O$; and
no $Bi_2O_3$.

\* \* \* \* \*